United States Patent Office 3,120,403
Patented Feb. 4, 1964

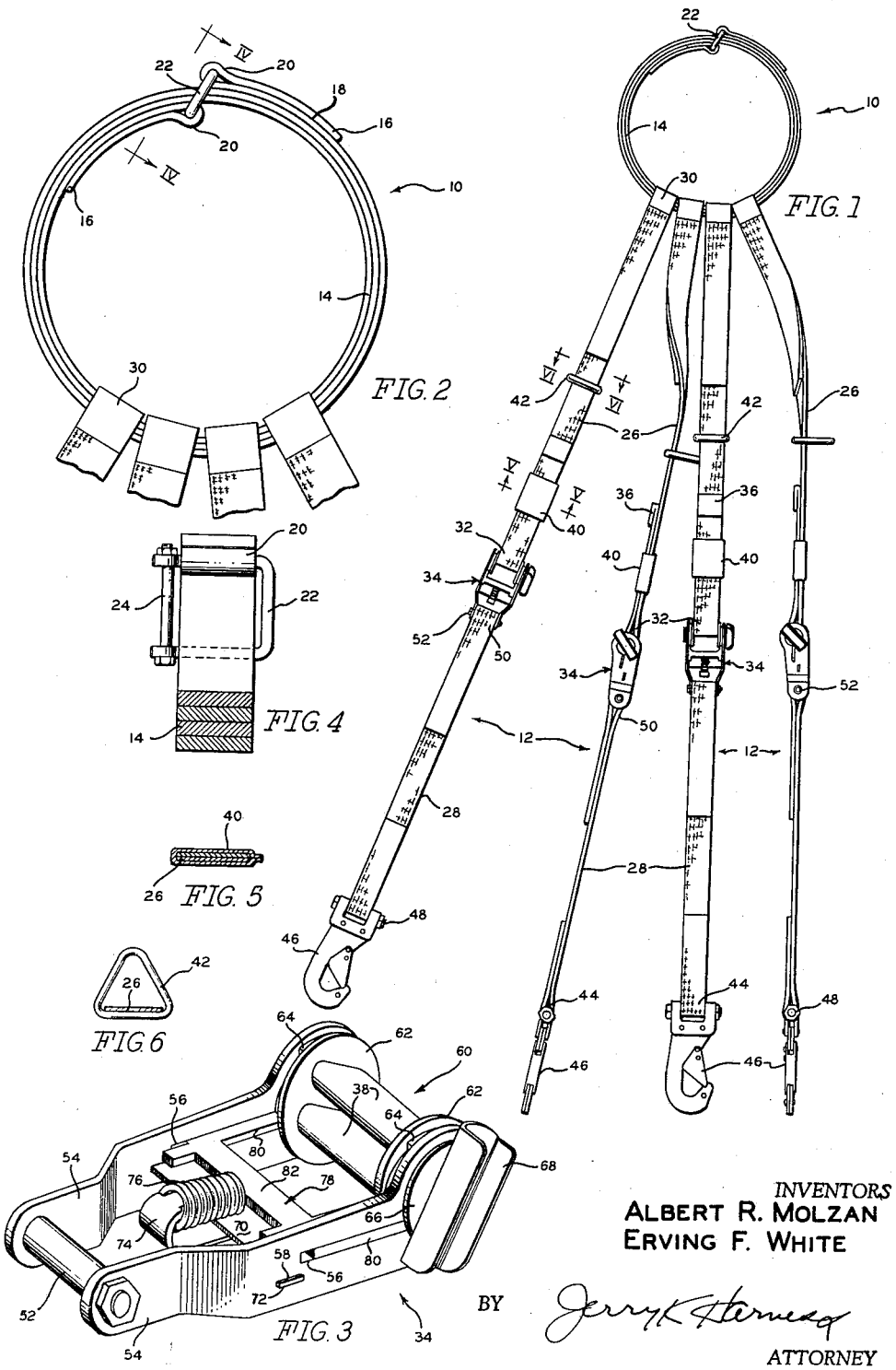

3,120,403
CARGO SLING
Albert R. Molzan, Pasadena, and Erving F. White, Tarzana, Calif., assignors to Aeroquip Corporation, Jackson, Mich., a corporation of Michigan
Filed June 21, 1961, Ser. No. 118,680
3 Claims. (Cl. 294—74)

The invention pertains to a cargo sling and particularly relates to a cargo sling of the aerial type which may be employed with helicopters and the like for carrying suspended external loads.

Many applications have been made of the ability of helicopters to carry suspended loads, especially in military service, and with the development of larger aircraft the suspended load capacities and variety of cargo transportable is ever increasing. Some loads, such as boxes and crates, are of regular configuration and may have lift rings and anchors attached thereto and present little or no problems as to attachment to the cable suspended from the helicopter. However, the suspended load often consists of an irregularly shaped object such as an artillery piece, truck, pontoons, or a plurality of small articles on a pallet or wrapped in a cargo net.

To simplify the attachment of all types of loads to the helicopter cable, attempts have been made to construct a universal cargo sling which meets the many requirements necessary to fulfill the desired specifications. Previously manufactured slings fell short of providing a practical universal sling and the present invention is considered the first to successfully meet all the requirements of this type of apparatus.

Among the important requisites of an aerial cargo sling are strength, minimum weight, flexibility, versatility, dependability, easy adjustability for a particular load, long service and shelf life and easy field replacement of broken or weakened components.

The basic object of the invention is to provide a cargo sling having a construction which fulfills the aforementioned requisites and does so in relatively simple and economical manner.

A further object of the invention is to provide an aerial cargo sling which may be employed with release devices which drop the upper portion of the sling on the load wherein the possibility of damaging the load by the dropped sling is eliminated.

Another object of the invention is to provide an aerial cargo sling employing a ring member having a plurality of leg members attached thereto wherein each of the leg members is provided with load attaching means, is adjustable in length and may be readily attached to or removed from the ring member.

Yet another object of the invention is to provide an aerial cargo sling employing adjustable leg members wherein length adjustment is provided by a ratchet buckle included in the leg member which is easily operated and wherein the leg members are constructed in two portions such that a rapid major adjustment is possible.

These and other objects of the invention arising from the details and relationships of the components of an embodiment thereof will be apparent from the following description and accompanying drawings wherein:

FIG. 1 is an assembly elevational view of a cargo sling in accord with the invention, FIG. 2 is an enlarged detail view of the assembled ring member employed with the embodiment of FIG. 1, FIG. 3 is a perspective view of the adjustment buckle employed with the leg members, FIG. 4 is a detail view of the ring member clevis taken along section IV—IV of FIG. 2, FIG. 5 is a sectional view of the upper leg portion keeper taken along section V—V of FIG. 1, and FIG. 6 is a sectional detail view of the delta ring mounted on the upper leg portions taken along section VI—VI of FIG. 1.

The general appearance and relationship of the components of a cargo sling in accord with the invention is best shown in FIG. 1. The cargo sling basically consists of a ring member 10 from which depend a plurality of leg members 12. The ring member 10 is adapted to be gripped by a hok or other means attached to the load supporting cable suspended from the helicopter or other supporting means. Usually automatic release means are employed with the helicopter cable which cooperate with the ring member wherein upon the suspended load being lowered to the ground the release means will automatically drop the sling. In the illustrated embodiment four leg members are shown as employed with a single ring; however, it will be appreciated that more or fewer leg members may be used if desired.

The ring member 10 is preferably formed from an elongated strap 14 of fabric webbing, preferably webbing formed of synthetic fibers of high strength such as nylon. It is desired to form a loop at each end of the ring strap 14 and to this end the ends 16 of the strap are folded back over on themselves and sewed at 18 to form loops 20. The annular ring configuration is formed by spirally winding the strap 14 in the manner shown in FIG. 2 and a clevis 22 is inserted through the loops 20 to interconnect the ends of the strap. The nut and bolt 24, FIG. 4, is inserted through the ends of the clevis to complete the assembly of the ring.

The leg members 12 each consist of two strands or portions which are also preferably constructed of high strength fabric webbing, such as nylon webbing. As shown in FIG. 1, the upper leg member portion is designated 26 and the lower leg member portion is designated by reference character 28. Leg portions 26 are formed at their outer or upper end with a loop 30 by folding the end of the leg portion back upon itself and sewing the same to the main leg portion. The loops 30 circumscribe the ring member 10, FIG. 2, in a manner wherein the lops may be easily positioned upon the ring periphery. The inner end 32 of the leg portions 26 are attached to the spool of the adjustment buckle 34, as will be later described.

In assembling the leg portion 26 to the buckle, the end 36 of the portion is inserted between the spaced parallel members 38 of the buckle spool and then inserted through a keeper 40 circumscribing the leg portion 26, as shown in FIG. 5.

Thereupon, the end 36 is folded and sewed back upon itself to prevent the end from being pulled back through the keeper. A delta ring 42, FIG. 6, is placed on the leg member portion 26 prior to the assembly of the leg portion to either the ring or buckle.

The lower leg portion 28 is provided with a loop 44 defined at its lower or outer end by folding the portion end back upon itself and sewing the end to the main portion body. A load attaching member consisting of a hook 46 in the disclosed embodiment, is affixed to the loop 44 by means of a bolt 48 passing therethrough. The inner end of the leg portion 28 is also formed with a loop 50 by sewing the inner end back upon itself, and the adjustment buckle 34 is attached to this loop by passing the bolt member 52 therethrough, FIG. 3.

The construction of the adjustment buckle 34 is best shown in FIG. 3 wherein the buckle is shown before it is attached to the leg member portions. The disclosed buckle is a modificaiton of the buckle disclosed in U.S. Patent No. 2,874,431. The buckle member consists of a pair of spaced stamped body members 54 each having a slot 56 defined therein, a rectangular opening 58, and holes, not shown, concentric to the axis of rotation of the spool 60. The spool 60 includes the parallel members 38 having discs 62 affixed at each end for rotation therewith. Each end of the spool is provided with a ratchet wheel 64 adjacent the discs 62 and of a lesser diameter having ratchet teeth thereon and stamped bearing discs 66 are provided on the outside of the body members 54. A spool rotating member 68 is affixed to the spool for the rotation thereof. The aforedescribed spool construction will be apparent in greater detail from the above identified patent. A spring anchor bar 70 is interposed between the body members 54 and has projections 72 thereon which extend through the rectangular openings 58. The anchor includes a U-shaped member 74 against which a compression spring 76 bears. Unidirectional spool rotation is controlled by a stamped dog member 78 consisting of longitudinally extending portions 80, which are slidably received within the slots 56 and engage the ratchet wheels periphery, connected by a transversely disposed portion 82 having a projection thereon extending into the spring 76. The spring 76 biases the ends of portions 80 into engagement with the teeth of the ratchet wheels, and hence, restricts rotation of the wheel in a single direction. Upon the operator grasping the portion 82, the portions 80 may be retracted from the ratchet wheels to permit free rotation of the spool in either direction. The bolt member 52 extends between the body members 54 to affix the buckle to the inner lower leg portion end.

To assemble the leg members 12 to the ring member 10 the ring will be in the elongated strap form and may be inserted through the loops 30 of the desired number of leg members. The ring member strap 14 is then wound in spiral fashion being inserted through the loops 30 upon each revolution of the end being wound. After three windings of the strap, the ring member will be formed and may be assembled by the use of the clevis 22 and bolt 24.

In use, the cargo sling ring member 10 is located over the center of gravity of the load to be suspended. The leg members 12 are then individually adjusted to the desired length to maintain the ring substantially over the gravity center of the load during lifting. In adjusting the length of the leg members, the rough or quick adjustment may be made by grasping the end 36 of the upper leg member portion, and pulling the same toward the ring permitting the member 26 to slip relative to the buckle members 38. It will be appreciated that the leg portion 26 is looped around only one of the spool members 38. The final adjustment of the leg member 12 is made by rotating the buckle spool actuating member 68 with the fingers to wrap the inner end 32 of the leg portion upon the spool 60. This final adjustment may take place after the helicopter cable is attached to the ring member. It will therefore be appreciated that each of the leg members may be very quickly and accurately adjusted to the desired length to permit the ring member to be located over the load center of gravity and hence insure that the suspended load will be evenly balanced and properly carried by the helicopter.

Should the load being carried be such that it is not desired to attach the hooks 46 directly thereto, or to a cargo net, the hooks 46 may be inserted under the load and brought around and hooked upon the delta ring 42 of the associated leg member to lift the load. Also, in a circumstance where a very short leg member length is desired the hook 46 may be directly attached to the buckle 34 by the use of the bolt 48.

Should one of the leg members 12 become worn or damaged, the leg member may be quickly replaced merely by disassembling the ring member clevis 22 to disassemble the ring and place a new leg member thereon. Likewise, the ring strap, buckle and hooks may be easily replaced. To minimize wear between the loops 30 and the ring member, a wear pad of cotton may be sewed on the inside of the loop.

In that the ring member 10 is constructed of fabric webbing, it will be appreciated that upon the automatic release of the cargo sling the dropping of the upper portion of the cargo sling, including the ring member, upon the load will not damage the load. In a commercial embodiment of the invention, the disclosed sling is capable of lifting 40,000 lbs. wherein the ring and leg members are formed of nylon webbing. In that each leg member is independently adjustable in length and the adjustments may be very quickly and easily accomplished a versatility and flexibility is produced by the invention which is unknown with present constructions.

It will be appreciated that various embodiments of the invention may be apparent to those skilled in the art without departing from the spirit and scope thereof, and it is intended that the invention be defined only by the scope of the following claims.

We claim:
1. A cargo sling particularly adapted for aerial use, comprising, in combination, a flexible ring member of high strength, light weight material, a plurality of elongated leg members of flexible, high strength, light weight material, said leg members having one end attached to said ring member and load attaching means attached to the other end of said leg members, and adjusting means operatively associated with each of said leg members intermediate the ends thereof for selectively varying the length of the leg members, said ring member being formed by an elongated strap wound in a spiral manner to form a plurality of layers and including releasable securing means interconnecting the inner and outer ends of said strap.

2. The subject matter of claim 1 wherein said inner and outer ends of said strap are provided with loops and said securing means has portions spanning the thickness of said layers and extending through said loops.

3. The subject matter of claim 2 wherein said strap is formed of webbed fabric.

References Cited in the file of this patent
UNITED STATES PATENTS

| | | |
|---|---|---|
| 2,343,045 | Butler | Feb. 29, 1944 |
| 2,532,306 | Herbert | Dec. 5, 1950 |
| 2,874,431 | Elsner | Feb. 24, 1959 |
| 2,970,729 | Allen | Feb. 7, 1961 |

FOREIGN PATENTS

| | | |
|---|---|---|
| 1,223,402 | France | of 1960 |